United States Patent
Tanno et al.

(10) Patent No.: US 6,483,645 B1
(45) Date of Patent: Nov. 19, 2002

(54) GARNET CRYSTAL FOR FARADAY ROTATOR AND OPTICAL ISOLATOR HAVING THE SAME

(75) Inventors: Masayuki Tanno; Satoru Fukuda, both of Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 66 days.

(21) Appl. No.: 09/686,678

(22) Filed: Oct. 11, 2000

(30) Foreign Application Priority Data

Oct. 12, 1999 (JP) .............................. 11-288943

(51) Int. Cl.⁷ ............................................. G02B 27/28
(52) U.S. Cl. ...................... 359/484; 359/280; 359/281; 359/282; 359/283; 359/284; 117/945; 117/11; 252/62.57; 428/228; 428/694; 428/701; 428/900
(58) Field of Search ..................... 359/484, 280–284; 117/11, 945; 252/62.57; 428/228, 694, 701, 900

(56) References Cited

U.S. PATENT DOCUMENTS 5,662,740 A * 9/1997 Yamasawa et al. ............ 117/11

* cited by examiner

*Primary Examiner*—Audrey Chang
*Assistant Examiner*—Craig Curtis
(74) *Attorney, Agent, or Firm*—Reed Smith LLP

(57) ABSTRACT

An optical isolator comprsing at least two parts of a Faraday rotator obtained from a garnet crystal and an analyzer, which is small in size, can be mounted directly to a semiconductor laser. The garnet crystal is grown, by a liquid-phase epitaxial growth technique, on the substrate of a garnet with a lattice constant of 12.514±0.015 Å, and consists of the following composition formula:

$$(Tb_{1-(a+b+c+d)}Ln_aBi_bM^1_cEu_d)_3(Fe_{1-e}M^2_e)_5O_{12}$$

where Ln is an element selected from rare-earth elements excluding Tb and Eu, and Y; $M^1$ is an element selected from elements Ca, Mg, and Sr; $M^2$ is an element selected from elements of Al, Ga, Sc, In, Ti, Si, and Ge; a, b, c, d, and e are defined as $0 \leq a \leq 0.5$, $0.3 < b \leq 0.6$, $0 \leq c \leq 0.02$, $0 < d \leq 0.3$, and $0.01 < e \leq 0.3$, respectively.

8 Claims, 2 Drawing Sheets

GARNET CRYSTAL FOR FARADAY ROTATOR AND OPTICAL ISOLATOR HAVING THE SAME

BACKGROUND OF THE INVENTION

This invention relates to an optical isolator which is an optical part used in an optical communication system and has a garnet crystal as a Faraday rotator.

In an optical communication system, when transmission light emitted from a semiconductor-laser light source is transmitted through an optical system, a communication obstacle will be brought about if part of the light is reflected by the entrance end face of the optical system and is returned to the light source. An optical isolator, provided to block such return light, is an optical part interposed between the laser and the optical system, and is such that a Faraday rotator constructed of a garnet crystal always assuming magnetism is sandwiched between a polarizer and an analyzer and is encased, for example, in a cylindrical magnet.

Since the optical isolator is used integrally with a semiconductor laser, it is necessary to satisfy requirements that: (1) it is small in size and can be mounted directly to the surface of the semiconductor laser, (2) the element length of the Faraday rotator is short, (3) the temperature dependency of an extinction ratio is small, and (4) a loss in the amount of incident light is slight. In order to miniaturize the optical isolator, an attempt is made to reduce the saturation magnetization of the Faraday rotator to thereby make a magnet small. For example, Japanese Patent Provisional Publication No. Hei 9-185027 discloses a bismuth-substitution rare-earth iron garnet crystal, as a Faraday rotator which is low in saturation magnetization and exhibits stable, rectangular hysteresis characteristics. However, this garnet crystal, because of its weak Faraday rotation effect, is such that the element length of the Faraday rotator is long and the temperature dependency of an angle of Faraday rotation is large. Japanese Patent Provisional Publication No. Hei 11-1394 discloses a low-saturation bismuth-substitution iron garnet single crystal film which is low in saturation magnetization, has a considerable Faraday rotation effect, and is small in temperature dependency of an angle of Faraday rotation. In this crystal, however, the element length of the Faraday rotator is long.

A small-sized, optical isolator satisfying the above requirements has not been available in the past.

SUMMARY OF THE INVENTION

It is, therefore, an object of the present invention to provide an optical isolator with a garnet crystal for a Faraday rotator which is small in size and can be mounted directly and in which the temperature dependency of an extinction ratio and a loss in the amount of incident light are small.

In order to achieve this object, the garnet crystal of the present invention is grown by a liquid-phase epitaxial growth technique on a substrate of a garnet with a lattice constant of 12.514±0.015 Å, and is expressed by the following composition formula:

$(Tb_{1-(a+b+c+d)}Ln_aBi_bM^1{}_cEu_d)_3(Fe_{1-e}M^2{}_e)_5O_{12}$

In this formula, Ln is an element selected from rare-earth elements excluding Tb and Eu, and Y; $M^1$ is an element selected from elements of Ca, Mg, and Sr; $M^2$ is an element selected from elements of Al, Ga, Sc, In, Ti, Si, and Ge; a, b, c, d, and e are defined as $0 \leq a \leq 0.5$, $0.3 < b \leq 0.6$, $0 \leq c \leq 0.02$, $0 < d \leq 0.3$, and $0.01 < e \leq 0.3$, respectively.

Bi serves to improve the Faraday rotation effect in proportion to its amount existing in the garnet crystal and to reduce the element length of the Faraday rotator. Bi must exist within the range of $0.3 < b \leq 0.6$ in the garnet crystal, and thereby a Faraday rotation coefficient at a wavelength of 1.55 μm band used in an ordinary optical communication system can be set to at least 1050°/cm. If the value of b exceeds 0.6, the lattice constant of the garnet crystal will be out of the desired range.

Ca, Mg, or Sr represented by the element $M^1$ serves to improve the transmittance of light of the garnet crystal and to minimize a loss in the amount of incident light.

Eu is indispensably contained in the garnet crystal to improve the transmittance of light of the garnet crystal and to minimize a loss in the amount of incident light.

The element $M^2$ is Al, Ga, Sc, In, Ti, Si, or Ge which can be replaced with Fe. When Al, Ga, Sc, or In is present, the lattice constant is set in the desired range, and saturation magnetization is reduced with respect to a saturation magnetic flux density. If Ti, Si, or Ge coexists with Fe which is a bivalent ion, in the garnet crystal, the transmittance of light of the garnet crystal will be improved, as in the case where Ca, Mg, or Sr coexists, and the loss in the amount of incident light will be minimized. The element $M^2$ is contained within the range of $0.01 < e \leq 0.3$ in the garnet crystal. Beyond this range, the lattice constant is out of the desired range, and the absolute value of the Faraday rotation coefficient at a wavelength of 1.55 μm band becomes 1000°/cm or less. This lessens the Faraday rotation effect.

It is desirable that the substrate of a garnet with a lattice constant of 12.514±0.015 Å is formed of a garnet which does not contain Nd. As an example of such a substrate is cited NOG (a trade name in Shin-Etsu Chemical Co., Ltd.) which is the substrate of a garnet expressed by the chemical formula of $(CaGdMgZrGa)_8 O_{12}$ in which Ca, Zr, and Mg are added for substitution to a gadolinium-gallium garnet. Nd has the property of absorbing light with a wavelength of 1.55 μm band. When a crystal is thus grown by the liquid-phase epitaxial growth technique on an NGG (a trade name in Shin-Etsu Chemical Co., Ltd.) substrate having a garnet structure expressed by the chemical formula of $Nd_3Ga_5O_{12}$, Nd will be admixed into a growing garnet crystal if a small fraction of $Nd_3Ga_5O_{12}$ is mixed with a molten material. This increases the loss in the amount of incident light on the Faraday rotator.

In this garnet crystal, a compensation temperature at which saturation magnetization becomes zero is −50° C. or less and the saturation magnetization at temperatures of −40–100° C. is as small as 400 gauss (31.8 KA/m) or less.

An optical isolator includes at least two parts of a Faraday rotator obtained from the above garnet crystal and an analyzer.

The optical isolator is generally used in the temperature range of −40–100° C. The garnet crystal has the properties that the saturation magnetization is low in this temperature range, the compensation temperature at which the saturation magnetization becomes zero is lower than in the temperature range, and the Faraday rotation effect is heightened. The temperature dependency of the extinction ratio and the loss in the amount of incident light on the optical isolator with the Faraday rotator constructed of the garnet crystal are small.

DETAILED EXPLANATION OF THE INVENTION

The embodiments of the present invention will be described in detail below but the claimed invention will not be limited thereby.

The garnet crystal is obtained by the liquid-phase epitaxial growth technique as follows: $Tb_4O_7$, $Bi_2O_3$, $Eu_2O_3$, $Ga_2O_3$, and $Fe_2O_3$ which are the ingredients of a garnet are mixed with $B_2O$ and PbO which are the ingredients of a flux, in a platinum crucible, and a resulting mixture is heated into a melt. The substrate of a garnet with a lattice constant of 12.514±0.015 Å is immersed in this melt and is rotated. By doing so, a garnet crystal with a lattice constant of 12.514±0.015 Å is grown on the substrate.

Figure 1:
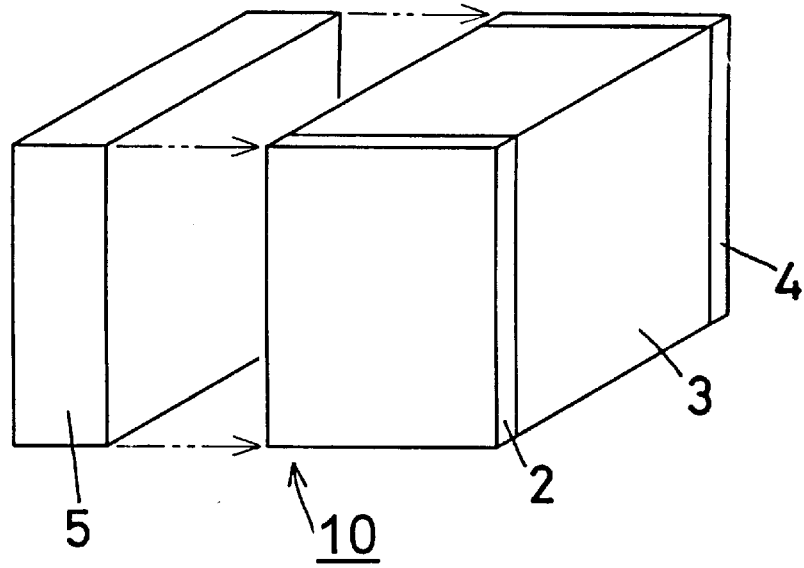
FIG. 1 is a perspective view showing an embodiment of the optical isolator according to the present invention, FIG. 2—is a perspective view showing another embodiment of the optical isolator according to the present invention

An embodiment of optical isolator shown in FIG. 1 is obtained the following way: The garnet crystal thus obtained is cut off from the substrate, and both surfaces of the garnet crystal are ground to attain a moderate thickness to finish a Faraday rotator. Both surfaces of the Faraday rotator are applied with antireflection coating and then one surfaces thereof is bonded to a polarizer made of polarization glass and the other surfaces is bonded to an analyzer 4 made of the same with silicone adhesive. The bonded polarizer/Faraday rotator/analyzer is cut off into a square piece with a predetermined width. A magnet 5 is bonded to one side of the piece of the polarizer 2/Faraday rotator 3/analyzer 4 with the silicone adhesive. The magnet 5 having a thickness of less than 1 mm is used.

Also, polarizer 2/Faraday rotator 3/analyzer 4 may be encased in a cylindrical magnet.

The optical isolator may be arranged in order of a polarizer, a first Faraday rotator, a analyzer and a second Faraday rotator.

Furthermore, the optical isolator may be arranged in order of a polarizer, a first Faraday rotator, a first analyzer, a second Faraday rotator and a second analyzer.

Such optical isolators having the second Faraday rotator further heighten the effect that light incident from a forward direction is passed and light incident from a reverse direction is blocked.

Figure 2:
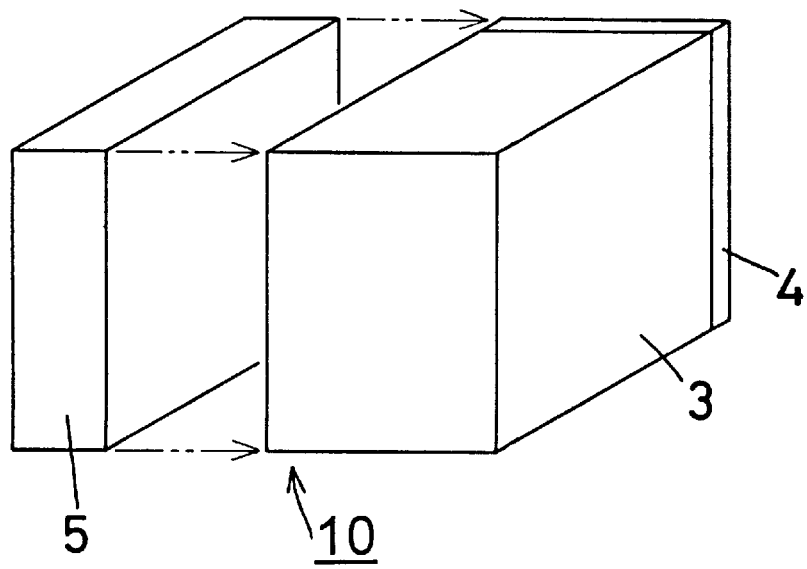
Figure 3:
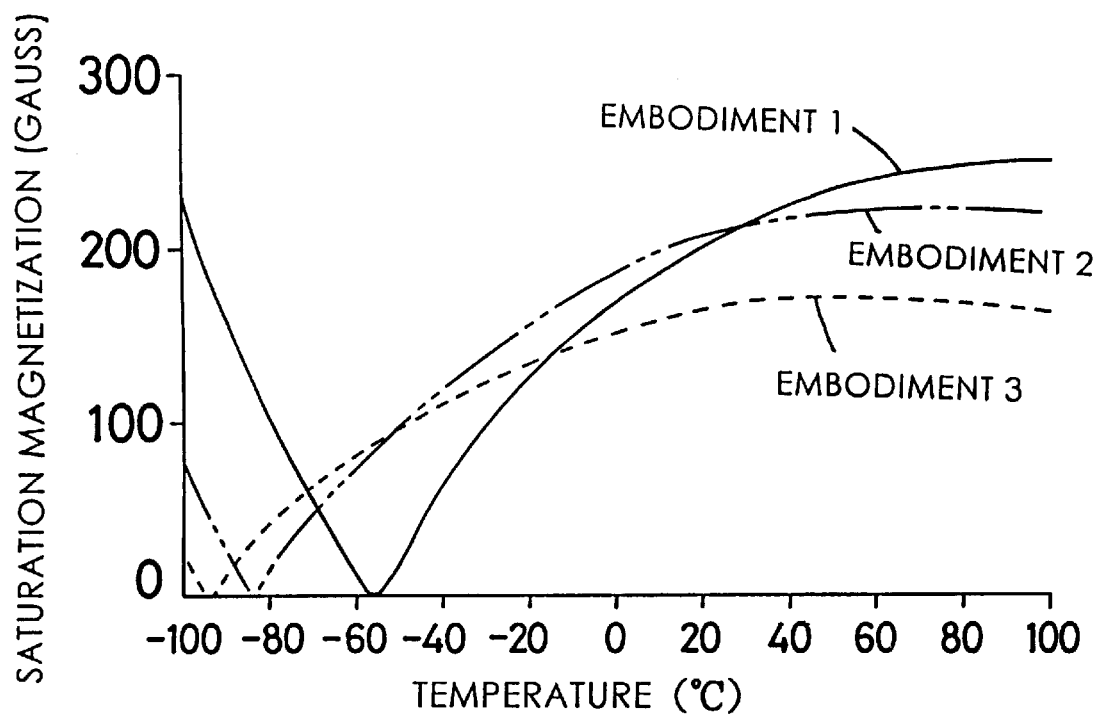
FIG. 3 is a diagram showing the relationship between the saturation magnetization and the temperature of a garnet crystal used for a Faraday rotator according to the present invention.

An optical isolator 10 shown in FIG. 2 is a type of polarization dependency as another embodiment. The optical isolator 10 is arranged in order of a Faraday rotator 3 obtained from the garnet crystal and an analyzer 4 made of polarization glass. Linear polarization should be used to this type of the optical isolator 10 as incident ray into the Faraday rotator 3. Plane of the incident linear polarization should be fitted to linear polarization of the analyzer 4 after rotating the incident linear polarization through the Faraday rotator 3.

Fabrication examples relative to the optical isolator which uses the garnet crystal according to the present invention are shown in Examples 1–3. Examples relative to an optical isolator using a garnet crystal with the exception of the present invention are shown in Comparative examples 1 and 2.

EXAMPLE 1

A platinum crucible is charged with 12.26 g of $Tb_4O_7$, 1.31 g of $Eu_2O_3$, 7.30 g of $Ga_2O_3$, 1036 g of $Bi_2O_3$, 35.40 g of $B_2O_3$, and 794 g of PbO, as the ingredients of the garnet crystal, which are heated at 1040° C. into a melt. After that, the melt is maintained at 790° C. An NOG (a trade name in Shin-Etsu Chemical Co., Ltd.) substrate, 74 mm in diameter and 1.4 mm in thickness, of a garnet with a lattice constant of 12.501 Å is brought into contact with the surface of the melt while being rotated so that a crystal is grown. A crackless garnet crystal with a thickness of about 0.51 mm is formed on each surface of the substrate. When this crystal is measured by a plasma emission analytical technique, it is found to be a garnet crystal expressed by a chemical formula of $Tb_{1.75} Bi_{1.15} Eu_{0.1} Fe_{4.45} Ga_{0.55} O_{12}$. The lattice constant measured by a Bond method is 12.500 Å.

The garnet crystal is cut off from the surface of the substrate, and after mirror grinding is applied to both surfaces of the garnet crystal to attain a thickness of 0.37 mm, the garnet crystal is cut into a 2 mm square. A two-layer antireflection coating including $SiO_2$ and $Al_2O_3$ is deposited on each surface thereof by evaporation to experimentally fabricate a Faraday rotator.

When the Faraday rotator is placed in a magnetic field with a magnetic field strength of 500 oersted (Oe) (39.8 KA/m) and transmits a linearly polarized light with a wavelength of 1.55 μm band, the plane of polarization of transmitted light rotates by 45.0°. The loss in the amount of incident light on the Faraday rotator is as small as 0.05 dB.

The temperature coefficient of the angle of Faraday rotation is defined by the following equation in accordance with angles of Faraday rotation $\theta f (t_1)$ and $\theta f (t_2)$ at temperatures $t_1$ and $t_2$, respectively:

$$\text{Temperature coefficient} = (\theta f (t_2) - \theta f (t_1))/(t_2 - t_1) \tag{1}$$

When the temperature dependency of the angle of Faraday rotation is discussed with respect to −40–85° C., the angle $\theta f (t)$ is −47.2° at −40° C., −45° at 25° C., and −41.0° at 85° C. When the temperature coefficient of the angle of Faraday rotation is calculated from Eq. (1) as $t_1 = -40°$ C. and $t_2 = 85°$ C., it is as small as 0.050°/° C.

When the temperature dependency of the garnet crystal on saturation magnetization is studied with respect to −100–100° C., as shown in FIG. 2, a compensation temperature at which the saturation magnetization becomes zero is −55° C., and at −40–100° C., the saturation magnetization $4\pi$ Ms is as small as 255 gauss (20.3 KA/m) or less.

Alternatively, mirror grinding is applied to both surfaces of the garnet crystal to smooth its optical surfaces, and the garnet crystal is cut into a 15 mm square with a thickness of 0.37 mm. A two-layer antireflection coating including $SiO_2$ and $Al_2O_3$ is deposited to fabricate a Faraday rotator. Polarization glasses 30 μm thick are cemented to both surfaces of the Faraday rotator by silicone adhesives, and the Faraday rotator is cut into a strip with a width of 0.5 mm so that a magnet with a thickness of 0.2 mm is cemented to one of its cutting surfaces by the silicone adhesive. A resulting optical part is cut lengthwise with a width of 0.7 mm to obtain an optical isolator. The loss in the amount of incident light on the optical isolator at a wavelength of 1.55 μm band is as small as 0.15 dB, and an extinction ratio at −40–85° C. is as high as 25 dB or more.

EXAMPLE 2

A garnet crystal is experimentally fabricated by the liquid-phase epitaxial growth technique in the same way as in Example 1 with the exception that 12.11 g of $Tb_4O_7$, 1.30 g of $Eu_2O_3$, 8.73 g of $Ga_2O_3$, 1166 g of $Bi_2O_3$, 29.90 g of $B_2O_3$, and 670 g of PbO are used as the ingredients of the garnet crystal and the NOG (a trade name in Shin-Etsu Chemical Co., Ltd.) substrate of a garnet with a lattice constant of 12.525 Å is employed. Consequently, a crackless garnet crystal with a thickness of about 0.35 mm is formed on each surface of the substrate. The garnet crystal has the chemical formula of $Tb_{1.30}Bi_{1.65}Eu_{0.05}Fe_{4.3}Ga_{0.7}O_{12}$ and a lattice constant of 12.523 Å. A Faraday rotator is experimentally fabricated in the same way as in Example 1 with the exception that its thickness is set to 0.28 mm. When the Faraday rotator is placed in a magnetic field with a magnetic field strength of 500 oersted (Oe) (39.8 KA/m) and transmits a linearly polarized light with a wavelength of 1.55 μm band, the plane of polarization of transmitted light rotates by 45.0°. The loss in the amount of incident light on the Faraday rotator is as small as 0.04 dB.

When the temperature dependency of the angle of Faraday rotation is discussed with respect to −40–85° C., the angle θf (t) is −47.4° at −40° C., −45° at 25° C., and −40.9° at 85° C. The temperature coefficient of the angle of Faraday rotation, calculated as $t_1=-40°$ C. and $t_2=85°$ C., is as small as 0.052°/° C.

When the temperature dependency of the garnet crystal on the saturation magnetization is studied with respect to −100–100° C., as shown in FIG. 2, the compensation temperature at which the saturation magnetization becomes zero is −83° C., and at −40–100° C., the saturation magnetization 4 π Ms is as small as 230 gauss (18.3 KA/m) or less.

An optical isolator is obtained in the same way as in Example 1 with the exception that mirror grinding is applied to both surfaces of the garnet crystal to smooth its optical surfaces and thereby its thickness is set to 0.29 mm. At a wavelength of 1.55 μm band, the loss in the amount of incident light on the optical isolator is as small as 0.14 dB, and the extinction ratio at −40–85° C. is as high as 25 dB or more.

EXAMPLE 3

A garnet crystal is experimentally fabricated by the liquid-phase epitaxial growth technique in the same way as in Example 1 with the exception that 9.39 g of $Tb_4O_7$, 1.29 g of $Eu_2O_3$, 9.32 g of $Ga_2O_3$, 1.66 g of $Y_2O_3$, 1166 g of $Bi_2O_3$, 29.9 g of $B_2O_3$, and 670 g of PbO are used as the ingredients of the garnet crystal and the NOG (a trade name in Shin-Etsu Chemical Co., Ltd.) substrate of a garnet with a lattice constant of 12.517 Å is employed. As a result, a crackless garnet crystal with a thickness of nearly 0.4 mm is formed on each surface of the substrate. The garnet crystal has the chemical formula of $Tb_{0.9}Bi_{1.6}Eu_{0.1}Y_{0.4}Fe_{4.15}Ga_{0.85}O_{12}$ and a lattice constant of 12.514 Å. A Faraday rotator is experimentally fabricated in the same way as in Example 1 with the exception that its thickness is set to 0.33 mm. When the Faraday rotator is placed in a magnetic field with a magnetic field strength of 500 oersted (Oe) (39.8 KA/m) and transmits a linearly polarized light with a wavelength of 1.55 μm band, the plane of polarization of transmitted light rotates by 45.0°. The loss in the amount of incident light on the Faraday rotator is as small as 0.04 dB.

When the temperature dependency of the angle of Faraday rotation is discussed with respect to −40–85° C., the angle θf (t) is −47.2° at −40° C., −45° at 25° C., and −40.9° at 85° C. The temperature coefficient of the angle of Faraday rotation, calculated as $t_1=-40°$ C. and $t_2=85°$ C., is as small as 0.052°/° C.

When the temperature dependency of the garnet crystal on the saturation magnetization is studied with respect to −100–100° C., as shown in FIG. 2, the compensation temperature at which the saturation magnetization becomes zero is −93° C., and at −40–100° C., the saturation magnetization 4 π Ms is as small as 180 gauss (14.3 KA/m) or less.

An optical isolator is obtained in the same way as in Example 1 with the exception that mirror grinding is applied to both surfaces of the garnet crystal to smooth its optical surfaces and thereby its thickness is set to 0.31 mm. At a wavelength of 1.55 μm band, the loss in the amount of incident light on the optical isolator is as small as 0.14 dB, and the extinction ratio at −40–85° C. is as high as 25 dB or more.

COMPARATIVE EXAMPLE 1

A garnet crystal is experimentally fabricated by the liquid-phase epitaxial growth technique in the same way as in Example 1 with the exception that 14.00 g of $Tb_4O_7$, 7.30 g of $Ga_2O_3$, 1036 g of $Bi_2O_3$, 35.40 g of $B_2O_3$, and 794 g of PbO are used as the ingredients of the garnet crystal and the NOG (a trade name in Shin-Etsu Chemical Co., Ltd.) substrate of a garnet with a lattice constant of 12.501 Å is employed. Consequently, a garnet crystal with a thickness of about 0.51 mm is formed on each surface of the substrate. The garnet crystal has the chemical formula of $Tb_{1.85}Bi_{1.15}Fe_{4.45}Ga_{0.55}O_{12}$ and a lattice constant of 12.500 Å. A Faraday rotator is fabricated in the same way as in Example 1 with the exception that its thickness is set to 0.37 mm. When the Faraday rotator is placed in a magnetic field with a magnetic field strength of 500 oersted (Oe) (39.8 KA/m) and transmits a linearly polarized light with a wavelength of 1.55 μm band, the plane of polarization of transmitted light rotates by 45.0°. However, the loss in the amount of incident light on the Faraday rotator is as large as 0.12 dB.

COMPARATIVE EXAMPLE 2

A garnet crystal is experimentally fabricated by the liquid-phase epitaxial growth technique in the same way as in Example 1 with the exception that 9.39 g of $Tb_4O_7$, 1.29 g of $Eu_2O_3$, 10.25 g of $Ga_2O_3$, 1.66 g of $Y_2O_3$, 1166 g of $Bi_2O_3$, 29.9 g of $B_2O_3$, and 670 g of PbO are used as the ingredients of the garnet crystal and an NGG (a trade name in Shin-Etsu Chemical Co., Ltd.) substrate of a garnet which has a lattice constant of 12.509 Å and includes Nd is employed. As a result, a garnet crystal with a thickness of approximately 0.4 mm is formed on each surface of the substrate. The garnet crystal has the chemical formula of $Tb_{0.9}Bi_{1.6}Eu_{0.1}Y_{0.38}Nd_{0.02}Fe_{4.0}Ga_{1.0}O_{12}$ and a lattice constant of 12.510 Å. A Faraday rotator is fabricated in the same way as in Example 1 with the exception that its thickness is set to 0.33 mm. When the Faraday rotator is placed in a magnetic field with a magnetic field strength of 500 oersted (Oe) (39.8 KA/m) and transmits a linearly polarized light with a wavelength of 1.55 μm band, the plane of polarization of transmitted light rotates by 45.0°. However, the loss in the amount of incident light on the element of the Faraday rotator is as large as 0.12 dB.

The garnet crystal for a Faraday rotator according to the present invention, as mentioned in detail above, is such that the compensation temperature at which saturation magnetization becomes zero is −50° C. or less and the saturation magnetization is as low as 400 gauss (31.8 KA/m) or less in the operating temperature range of −40–100° C. Thus, saturation occurs in a weak magnetic field by using a small magnet. Moreover, since the Faraday rotation coefficient is as large as 1050°/cm or more, the element length of the Faraday rotator can be reduced. Consequently, the optical isolator with the Faraday rotator including the garnet crystal is miniaturized and can be mounted directly to the surface of a semiconductor laser. The optical isolator is such that the extinction ratio at a wavelength of 1.55 μm band is as high as 25 dB or more and the loss in the amount of incident light is as small as 0.1 dB or less.

What is claimed is:

1. A garnet crystal, grown by a liquid-phase epitaxial growth technique on a substrate of a garnet with a lattice constant of 12.514±0.015 Å, consisting of the following composition formula:

$$(Tb_{1-(a+b+c+d)}Ln_aBi_bM^1_cEU_d)_3(Fe_{1-e}M^2_e)_5O_{12}$$

where Ln is an element selected from rare-earth elements excluding Tb and Eu, and Y; $M^1$ is an element selected from elements of Ca, Mg, and Sr: $M^2$ is an element selected from elements of Al, Ga, Sc, In, Ti, Si, and Ge; a, b, c, d, and e are defined as $0 \leq a \leq 0.5$, $0.3 < b \leq 0.6$, $0 \leq c \leq 0.02$, $0 < d \leq 0.3$, and $0.01 < e \leq 0.3$, respectively.

2. The garnet crystal according to claim 1, wherein said substrate includes an Nd free garnet.

3. An optical isolator comprising at least two parts of a Faraday rotator obtained from the above garnet crystal and an analyzer:

wherein the Faraday rotator obtained from a garnet crystal, grown by a liquid-phase epitaxial growth technique on a substrate of a garnet with a lattice constant of 12.514±0.015 Å, consisting of the following composition formula:

$$(Tb_{1-(a+b+c+d)}Ln_aBi_bM^1_cEu_d)_3(Fe_{1-e}M^2_e)_5O_{12}$$

where Ln is an element selected from rare-earth elements excluding Tb and Eu, and Y; $M^1$ is an element selected from elements Ca, Mg, and Sr; $M^2$ is an element selected from elements of Al, Ga, Sc, In, Ti, Si, and Ge; a, b, c, d, and e are defined as $0 \leq a \leq 0.5$, $0.3 < b \leq 0.6$, $0 \leq c \leq 0.02$, $0 < d \leq 0.3$, and $0.01 < e \leq 0.3$, respectively.

4. The optical isolator according to claim 3, wherein a magnet is placed on at least one of side faces of the parts.

5. The optical isolator according to claim 3, which further comprising a polarizer.

6. The optical isolator according to claim 3, which is arranged in order of a polarizer, a first Faraday rotator obtained from the garnet crystal, an analyzer and a second Faraday rotator obtained from the garnet crystal.

7. The optical isolator according to claim 3, which is arranged in order of a polarizer, a first Faraday rotator obtained from the garnet crystal, a first analyzer, a second Faraday rotator obtained from the garnet crystal and a second analyzer.

8. The optical isolator according to claim 3, which essentially consists of the Faraday rotator and the analyzer and is a type of polarization dependency.

* * * * *